(12) United States Patent
Plomteux et al.

(10) Patent No.: US 9,267,537 B2
(45) Date of Patent: Feb. 23, 2016

(54) UNIVERSAL TILTABLE LUMINAIRE SUPPORT

(75) Inventors: Alexandre Plomteux, Montréal (CA); Sergio Fabian Jurdana, Blainville (CA)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/441,266

(22) Filed: Apr. 6, 2012

(65) Prior Publication Data

US 2014/0105670 A1    Apr. 17, 2014

(51) Int. Cl.
*F21S 8/00* (2006.01)
*F16C 11/10* (2006.01)
*F21V 21/26* (2006.01)

(52) U.S. Cl.
CPC .............. *F16C 11/10* (2013.01); *F16C 11/103* (2013.01); *F21V 21/26* (2013.01); *Y10T 403/32254* (2015.01)

(58) Field of Classification Search
USPC ............ 403/92, 93, 95, 96, 97, 101; 362/427, 362/432
See application file for complete search history.

(56) References Cited

U.S. PATENT DOCUMENTS

| | | | | | |
|---|---|---|---|---|---|
| 1,466,859 | A | * | 9/1923 | Sutton | 248/291.1 |
| 1,550,841 | A | * | 8/1925 | Pecota | 403/93 |
| 3,811,715 | A | * | 5/1974 | Brudy | 403/93 |
| 4,363,561 | A | * | 12/1982 | Hsieh | 403/92 |
| 4,548,446 | A | * | 10/1985 | Warshawsky | 403/97 |
| 4,782,435 | A | * | 11/1988 | Manzoni | 362/427 |
| 5,515,744 | A | * | 5/1996 | Liao | 403/97 |
| 7,390,110 | B2 | * | 6/2008 | Katz et al. | 362/427 |
| 7,909,492 | B2 | * | 3/2011 | Ortiz-Gavin | 362/432 |
| 8,201,975 | B1 | * | 6/2012 | Chen et al. | 362/427 |
| 8,307,735 | B2 | * | 11/2012 | Wehage | 74/551.3 |
| 2006/0285915 | A1 | * | 12/2006 | Dellach et al. | 403/92 |

* cited by examiner

*Primary Examiner* — Michael P Ferguson (57) ABSTRACT

A universal tiltable joint (10) for a lighting fixture (11) includes a first joint portion (12) having an axial joint axis (A), a second joint portion (14) having the axial joint axis, one of the first joint portion and the second joint portion housed co-axially within the other of the first joint portion and the second joint portion, a co-axial gap (60) between the first joint portion and the second joint portion allowing movement at an angle to the axial joint axis, the movement causing at least one of engagement or disengagement of a safety feature (27) on the first joint portion and the second joint portion.

14 Claims, 8 Drawing Sheets

UNIVERSAL TILTABLE LUMINAIRE SUPPORT

TECHNICAL FIELD

The present invention generally relates to a support for a luminaire or lighting fixture. More specifically, in its various implementations and embodiments, the present invention relates to an adjustable support for a luminaire or lighting fixture which may be oriented at various angle settings and mounted in multiple orientations.

BACKGROUND

In illuminating various types of areas, such as, for example, roadways, adjustable joints or supports may be utilized for luminaire or lighting fixture adjustment to disperse the light in a desirable location and/or pattern.

Various types of luminaire joints have been suggested for positioning lighting fixtures. Certain joints allow rotation. Certain adjustable joints rely on a fastener to limit movement. When the fastener is loosened, however, the joints may move uncontrollably.

Other adjustable supports require wiring to be positioned exterior to the joint. These systems require additional components to compensate for exterior wiring and environmental conditions. For example, seals and associated assembly time increase cost of manufacture of these joints. Moreover, despite these seals, the wiring or controls are still vulnerable to the environment conditions.

Still other joints may be slidably adjustable. However, in order to render these joint types adjustable, the joints require multiple parts and therefore are typically more costly and prone to mechanical malfunctions.

Thus, there is a need in the art to provide an adjustable luminaire joint that may optionally overcome these or other drawbacks associated with existing luminaire joints or supports.

SUMMARY

It is an object of the present invention to provide adjustable movement in a lighting fixture and that may optionally overcome one or more drawbacks associated with existing luminaire joints. Accordingly, Applicant has recognized and appreciated that it would be beneficial to provide an improved joint device which provides a self-supporting safety feature in addition to being adjustable. Thus, various embodiments and implementations of the present invention are directed to an adjustable luminaire joint.

Generally, in one aspect, the invention relates to an adjustable joint for a luminaire with a first joint portion having an axial joint axis and a second joint portion having the axial joint axis. According to at least one embodiment, one of the first joint portion and the second joint portion is housed co-axially within the other of the first joint portion and the second joint portion. A co-axial gap defined between the first joint portion and the second joint portion allows movement at an angle to said the joint axis. For example, such movement may be radial. The movement allows engagement and disengagement of a safety feature, such as ratchet teeth on the first joint portion and the second joint portion. Some embodiments may optionally further include at least one axial screw extending through the first joint portion and the second joint portion. The adjustable joint may further include one of said first and second joint portions having an aperture for the axial screw, wherein the aperture is elongated in a radial direction relative to the joint axis.

The adjustable joint may further include a radial screw extending through the first joint portion and the second joint portion for inhibiting motion in a radial direction. The first and second joint portions may have adjacent surfaces, the faces each having at least one ratchet tooth.

According to at least one embodiment, the adjustable joint further includes an angle indicator on one of the first and second joint portions. The joint may further include a receiver for a structural element on one of said first and second joint portions. The adjustable joint may further include a luminaire on the other of the first and second joint portions. The luminaire may connected to or alternatively integral with the first and second joint portions.

Generally, in another aspect, the invention relates to an articulating joint for a luminaire, that includes a partially cylindrical first joint portion which receives a partially cylindrical second joint portion allowing rotation of the first joint portion about the second joint portion. According to at least one embodiment, a safety feature includes a plurality of interengaging teeth on the first joint portion and the second joint portion, the first joint portion being movable radially relative to the second joint portion to release engagement of the interengaging teeth.

According to some embodiments, the articulating joint further includes a radial screw inhibiting or allowing the release of the engagement of the interengaging teeth. The articulating joint further includes an opening in the first joint portion to receive the second joint portion. The articulating joint further includes an aperture defined in the first joint portion extending in an axial direction. In some embodiments, the aperture is elongated in a radial direction. The articulating joint wherein the first joint portion is radially movable to disengage the interengaging teeth. One of the first joint portion and second joint portion may be movable relative to the other through a range of about 100 degrees.

In still other exemplary embodiments, a universal tiltable support for a lighting fixture includes a first joint portion pivotally receiving a second joint portion, the first portion pivoting about an axis passing through the first joint portion and the second joint portion. A safety feature may be disposed on at least one of the first joint portion and the second joint portion. An elongate aperture allows radial movement of the first joint portion relative to the second joint portion and the radial movement allows engagement or disengagement of the safety feature of the tiltable support. According to various embodiments, the safety feature includes a plurality of ratchet teeth on the first joint portion and the second joint portion. The ratchet teeth may allow movement of a preselected arcuate distance. The universal tiltable support further includes a gap defined between the first portion and the second joint portion allowing the first joint portion to move relative to the second joint portion.

The terms "luminaire" and "lighting fixture" are used interchangeably herein to refer to an implementation or arrangement of one or more lighting units in a particular form factor, assembly, or package. Such luminaire or lighting fixture may include one or more light sources of same or different types arranged within lighting units. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s).

The term "radial" is used to refer to the direction from the center of the joint or support outward or from the circumference inward along an imaginary radius. The term "axial" is used to mean situated in, on, or along an axis or pertaining to an axis of rotation of the joint or support.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the claimed invention. For example, various embodiments of the universal adjustable joint disclosed herein are particularly suited for and described in combination with various fixtures requiring adjustment in at least one dimension. Accordingly, for illustrative purposes, the claimed invention is discussed in conjunction with components of a joint. However, other configurations and applications of the adjustable joint are contemplated without deviating from the scope or spirit of the claimed invention. For example, in some embodiments the adjustable joint device may be implemented in combination with other structures of a lighting fixture (e.g., controller(s), transformer(s), motion sensor(s), dimming module(s), and/or photo sensor(s)), another non-LED power supply, and/or with one or more other lighting fixture. Additionally, the joint may be positioned in various orientations, have various ranges of adjustment, formed of various materials and structures allowing additional safety features and degrees of freedom.

Referring generally to FIGS. 1-8, embodiments of a universal tiltable luminaire joint are shown and described wherein the joint allows a luminaire or luminaire 11 to be mounted in multiple orientations and further allows the lighting fixture to be adjusted to multiple positions at desired angles. Additionally, the joint allows the luminaire 11 to be retained in a position without necessitating holding by the installer prior to securing of the joint.

Figure 1:
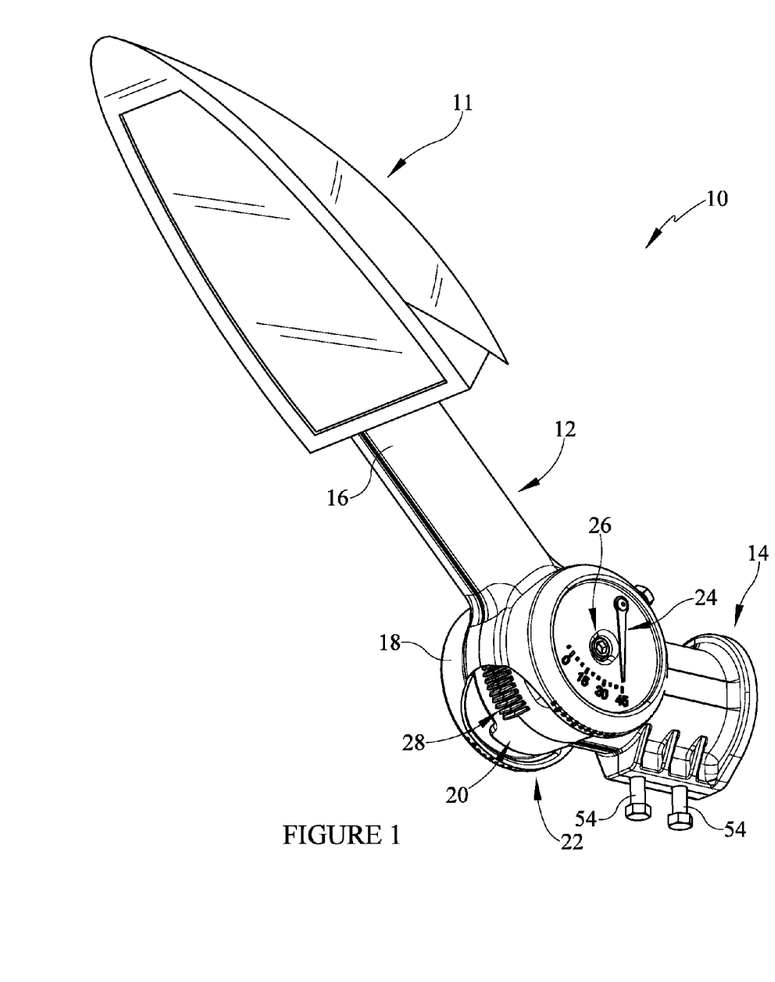
FIG. 1 illustrates a perspective view of an embodiment of an articulating joint for a luminaire.
Figure 8:
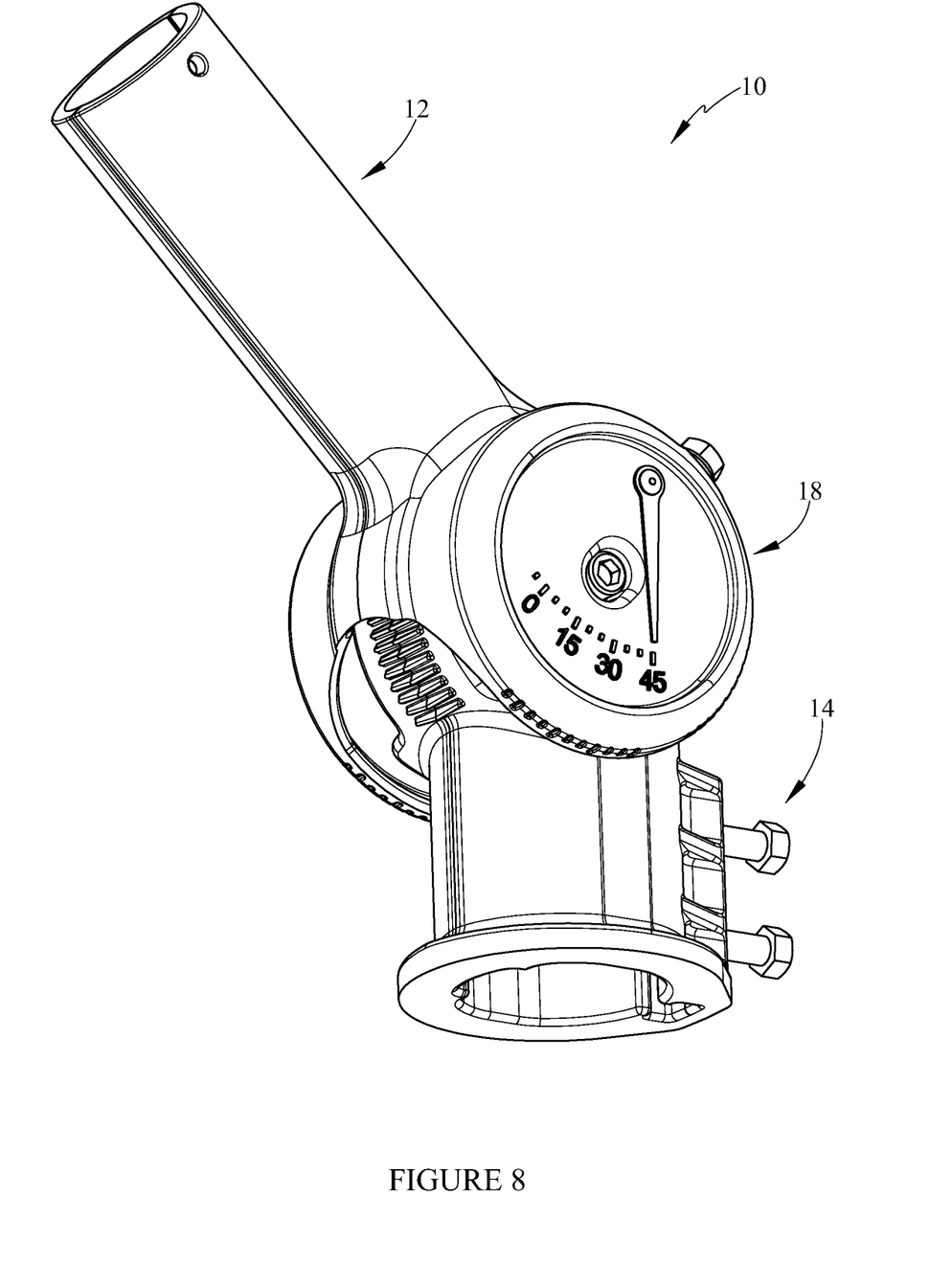
FIG. 8 illustrates a perspective view of the exemplary articulating joint of FIG. 1 in a vertical orientation.

Referring now to FIG. 1, an adjustable joint 10 for a luminaire 11 according to various embodiments of the invention, is depicted in perspective view. The joint 10 includes a first joint portion 12 and a second joint portion 14. One of the first and second joint portions 12, 14 is connected to the luminaire 11 and the other of the first and second joint portions 12, 14 is connected to the luminaire mounting structure (not shown), such as a pole, tenon or other fixed mounting structure. The joint 10 is capable of being mounted in a horizontal orientation or a vertical orientation. According to an exemplary embodiment and for consistency of description, the first joint portion 12 is described as being connected to the luminaire and the second joint portion 14 is described as being connected to a tenon or other fixed luminaire mounting structure. However, one skilled in the art should understand that this is merely an exemplary description and stated for purposes ease and consistency in the description and understanding. Further, as described herein, the terms horizontal and vertical refer to the orientation of the fixed or second joint portion 14 as will be understood further herein. Generally, the Figures depict second joint portion 14 in a horizontal orientation while FIG. 8 depicts the second joint portion 14 in a vertical orientation.

The first joint portion 12 includes a luminaire mounting structure 16. The exemplary embodiment is cylindrical in shape however alternative geometries may be utilized so as to cooperate with mounting structure of the luminaire 11. Additionally, although the lighting fixture is generally described as a separate structure of the joint 10, it should be understood that the luminaire 11 may be integrally formed with the any portion of the joint 10. At a base of the mounting structure 16 is a joint housing 18, which functions as a cover for the joint 10. The cover 18 is generally cylindrical defining an axial joint about which pivoting occurs. Distal from the joint housing 18 is the mounting end of the mounting structure 16 for receiving the luminaire.

The second joint portion 14 has an internal joint structure 20 disposed within the joint housing 18. With this description, it will be clear to one skilled in the art that the second joint portion 14 is fixed for mounting to a, for example, luminaire pole, tenon or other fixed structure while the first joint portion 12 is adjustable for a mounting to the luminaire. Extending from the internal joint portion 14 is a tenon receiver 50 wherein the various mounting structures recited above may be positioned. The joint housing 18 pivots about the internal joint structure 20.

The joint housing 18 has a pathway or opening 22 allowing movement of the tenon receiver 50 therethrough for a preselected range of motion. An angle indicator 24 is disposed on the outside of the joint housing 18 which indicates an angular position of the first or tiltable joint portion 12 relative to the second or fixed joint portion 14.

Additionally, an elongate aperture 26 is depicted on the outer surface of the joint housing 18 as it allows transverse movement to an axial axis of the first joint portion 12 relative to the second joint portion 14. This would disengage blocking structures, for example ratchet teeth, within the joint 10 and allow rotation of the joint portion 12 relative to the second joint portion 14.

Figure 2:
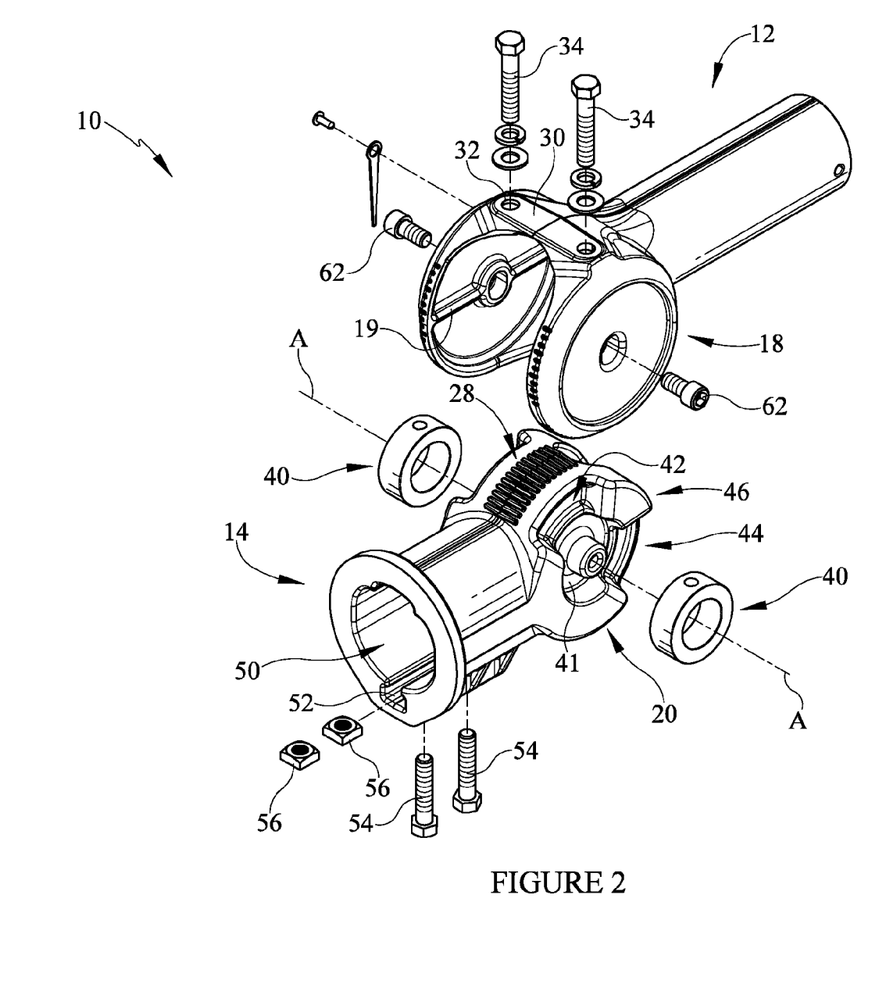
FIG. 2 illustrates an exploded perspective view of the exemplary articulating joint of FIG. 1.
Figure 3:
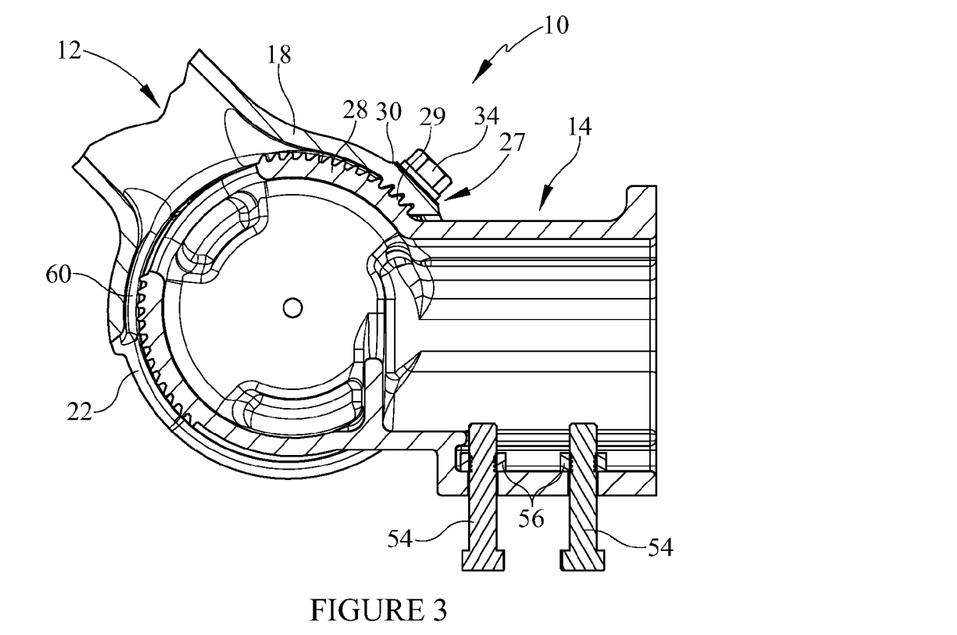
FIG. 3 illustrates a side-sectional view of the exemplary articulating joint of FIG. 1 in a horizontal orientation and sectioned in a first location.

Referring now to FIG. 2, an exploded perspective view of the joint 10 is shown. In this exploded view, the first joint portion or tiltable tenon 12 is shown with a landing 30 on an outer surface. The landing 30 includes at least one hole 32 which receives at least one fastener 34. The at least one fastener 34 passes through the joint housing 18 and engages structures mounted in or on the second joint portion 14 to provide two functions. The exemplary structure engaging the fastener 34 is a bushing 40. First, the fastener 34 pulls the joint housing 18 toward the bushing 40 which is seated within the second joint portion 14. The second function tightens ratchet teeth 29 (as shown in FIG. 3) of the joint housing 18 against ratchet teeth 28 of the second joint portion 14. The fastener 34 is depicted as bolt however alternate structures may be utilized such as rivets, screws, clamp, locking pins or other retaining structures, features or mechanisms.

Below the first joint portion 12 and exploded from the second joint portion 14 are the bushings 40 which are seated in bushing seats 41 of the second joint portion 14. The bushings 40 rotate within seats 41 about hubs and are connected by way of the at least one bolt 34 to the first joint portion 12 allowing rotation of the first joint portion 12 relative to the second joint portion 14. A mechanical detail 19 is shown on the inside surface of the housing 18. The mechanical detail 19 retains the bushing 40 within the seat 41 of internal joint structure 20. An axis A is shown extending through the bushings 40 in the internal joint structure 20. Rotation of the first joint portion 12 occurs about the axis A depicted in FIG. 2 relative to the exemplary fixed portion 14. Although a single degree of freedom is described, alternate motions may be incorporated in the joint 10.

Figure 3A:
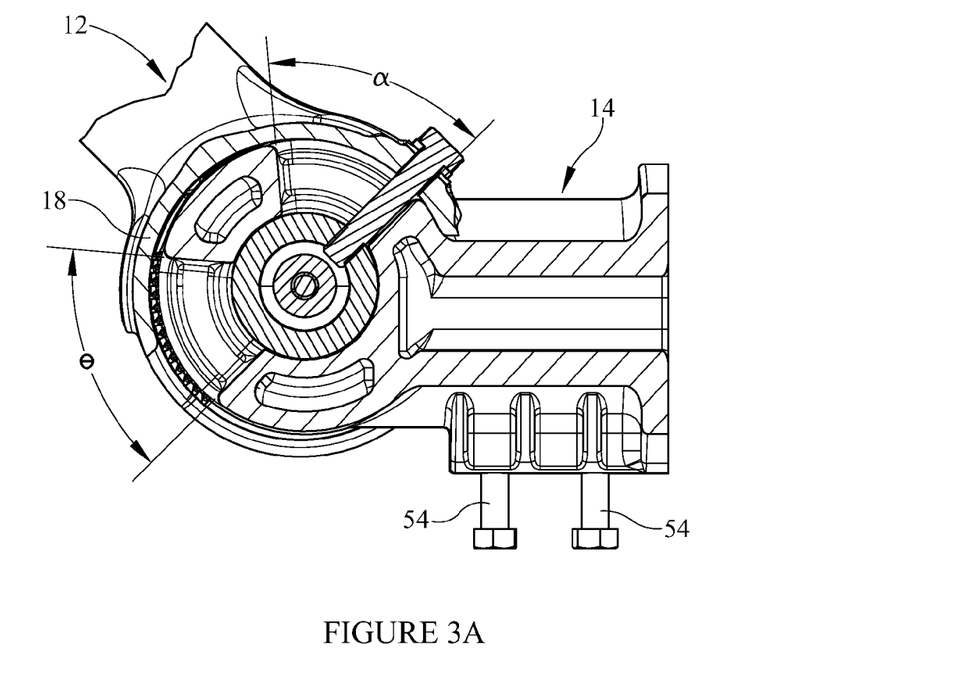
FIG. 3A illustrates a side-sectional view of the exemplary articulating joint of FIG. 3 in the horizontal orientation and sectioned in a second location.

The internal joint structure 20 further comprises an arcuate distance or clearance 44 for movement and a second arcuate clearance for movement 46. Separating the clearances 42, 44 is a travel stop or a limit 46. The stop 46 allows movement through the first clearance 42 through a pre-selected arcuate distance for example, up to 180 degrees. More desirably the range may be, for example, about 50 degrees, as indicated by comparing FIGS. 3A and 4A. However, other ranges may utilize and this range is merely exemplary. The first and second clearances 42, 44 may allow for movement of equal lengths or differing distances as indicated by angles α and (FIG. 3A). The angles may be up to 180 degrees and may be more desirably up to 100 degrees and even more desirably up to about 60 degrees. The clearance 42 is utilized for a joint 10 which is positioned in a horizontal orientation wherein the second joint portion 14 is mounted to a horizontal tenon. Alternatively, the second joint portion 14 may be mounted to a vertical tenon at which time the joint 10 is in a vertical configuration in the second clearance 44 may utilize to make adjustments to a luminaire position as shown in FIG. 8.

Extending from the upper surface of the internal joint structure 20 are a plurality of ratchet teeth 28. The teeth engage the inner teeth 29 (FIG. 3) of the joint housing 18. A second grouping of ratchet teeth 28 are located a radial distance from those shown in FIG. 1 spaced from teeth 28 shown in FIG. 2. The teeth 28 of FIG. 1 are utilized when the joint 10 is disposed in a different mounting orientation. The ratchet teeth 28 of FIG. 2 in combination with the teeth 29 (FIG. 3) of the first joint portion 12 engage one another to limit movement of the joint portion 12. The teeth 28 and 29 may be shaped to allow for a specific arcuate distance movement for the joint portion 12. For example, according to one embodiment, each tooth is sized so as to allow for five degrees of movement of the first joint portion 12.

Also depicted in the FIG. 2 is the tenon receiver 50. The depicted tenon receiver 50 has a generally circular cross-section and includes a slot 52 which receives nuts 56. Bolts 54 extend through the tenon receiver 50 to engage a mounting structure and tighten such structure within the receiver 50. The bolts 54 engage the bottom of a tenon and retain the tenon in position regardless of the size of the tenon relative to the receiver 50. By using the at least one bolt 54, mounting structures may be used of varying size. Also, although a circular cross section is generally shown, alternate shapes may be utilized and one skilled in the art should understand that the structure is not limited to circular shapes.

Figure 4:
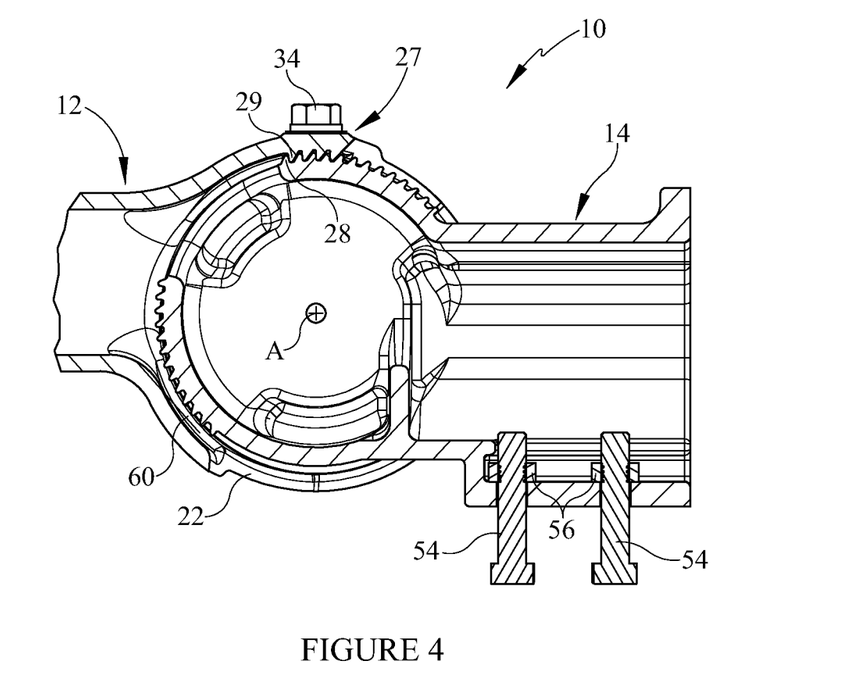
FIG. 4 illustrates a side-sectional view of the exemplary articulating joint of FIG. 3 in a second position and sectioned in the first location.
Figure 4A:
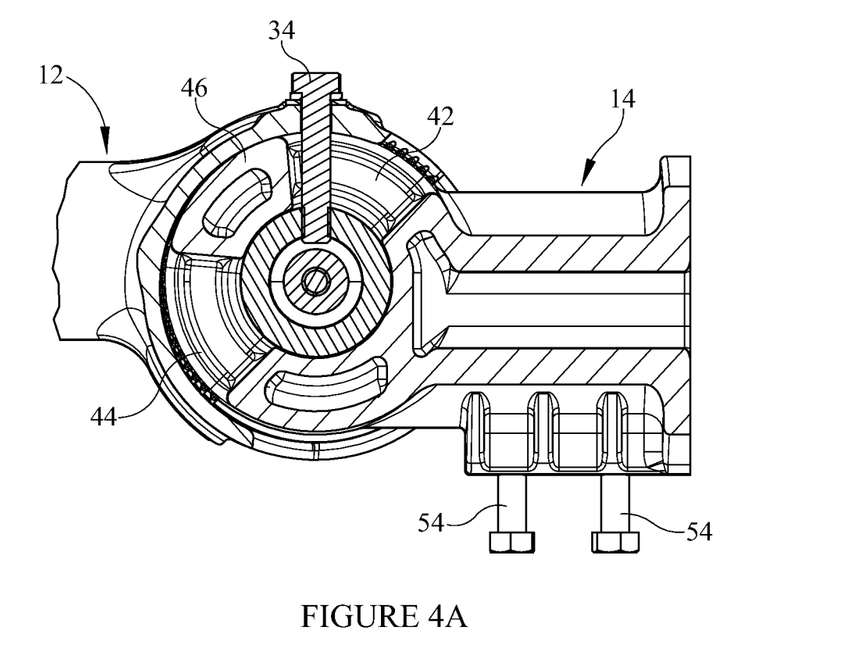
FIG. 4A illustrates a side-sectional view of the exemplary articulating joint of FIG. 4 in the second position and sectioned in the second location.

Referring now to FIGS. 3, 3a and 4, 4a the joint 10 is shown in a side sectional view. FIGS. 3 and 3a depict the joint 10 in a horizontal orientation at a first position with FIG. 3 having a section line through the center of the joint 10 and FIG. 3a depicting the joint 10 with the section line through center of the fastener 34. FIGS. 4, 4a depict the joint in the horizontal orientation at a second position with FIG. 4 having the same section line location as FIG. 3 and FIG. 4a having the same section line location as FIG. 3a. Referring first to FIGS. 3, 3a, the at least one fastener 34 is fastened through the landing 30 of the joint housing 18 with the bolt 34 passing therethrough, the ratchet teeth 28 of the second portion is fully engaged by the ratchet teeth 29 of the first joint portion 12. The bolt 34 is shown positioned toward the right hand end of the teeth 28. Normally when the bolt 34 is disengaged either partially or fully, a clearance 60 (FIG. 6) is created between the teeth 29 and 28. The gap or clearance 60 is depicted as a radial distance between the teeth 28 and 29. The clearance 60 allows rotation of the first joint portion 12 relative to the second joint portion 14 at least a distance of one tooth until gravity pulls the teeth 29 into engagement with teeth 28. However, tightening of bolt 34 causes locking of the teeth 29 with teeth 28. Thus the joint 10 has two features to inhibit rotation. First the teeth 28, 29 engage one another to inhibit uncontrolled rotation when the weight of the luminaire 11 or first joint portion 12 is unsupported during adjustment. Second, the at least one fastener 34 may be tightened to secure the joint 10 in a position once such position is determined.

According to the figure, the fastener 34 is at the far right hand end of the ratchet teeth 28. This position corresponds to the 45 degree angle depicted in FIG. 1 when the second joint portion 14 is in the horizontal configuration, by way of example. Referring now to FIGS. 4 and 4a, a side section view of the joint 10 is again shown in the horizontal configuration. As compared with FIG. 3, the fastener 34 is moved towards the left hand end of the ratchet teeth 28 corresponding to the zero degree position wherein the first joint portion 12 is substantially horizontal and parallel with the second joint portion 14. The fastener 34 is tightened so that the teeth 28, 29 cannot become disengaged.

Referring still to FIGS. 3, 3a and 4, 4a, the teeth 28 are depicted having a profile with one surface which is substantially transverse or perpendicular to the axis of the joint A and imaginary line extending though the center axis A. This surface limits, by engaging of teeth 29, movement of the first joint portion 12 in the counterclockwise direction. The second surface of the tooth profile is angled to allow easy movement of the first joint portion 12 in the clockwise direction. Thus the tooth 28 profile aids in stopping movement of the first joint portion 12 by only allowing movement a distance of one tooth at a time before gravity pulls the first joint portion 12 downward and causes engagement of the teeth 28, 29. These teeth define safety feature 27 (FIGS. 3 and 4) inhibiting uncontrolled movement of a luminaire 11 during the mounting process and before fastener 34 is fully tightened. The safety feature 27 further allows a single installer to install a luminaire because the safety feature 27 inhibits uncontrolled motion of the luminaire when the installer is not holding the luminaire or lighting fixture. Additionally, the safety feature 27 provides a simple and improved method of adjusting the position of the luminaire prior to tightening the joint and completing installation. However, other movement limiting safety structures are well within the scope of the appended claims. For example, the safety feature 27 may comprise a plurality of apertures which receive a biased pin or other retaining structure to lock the joint portions at preselected angular positions.

Figure 5:
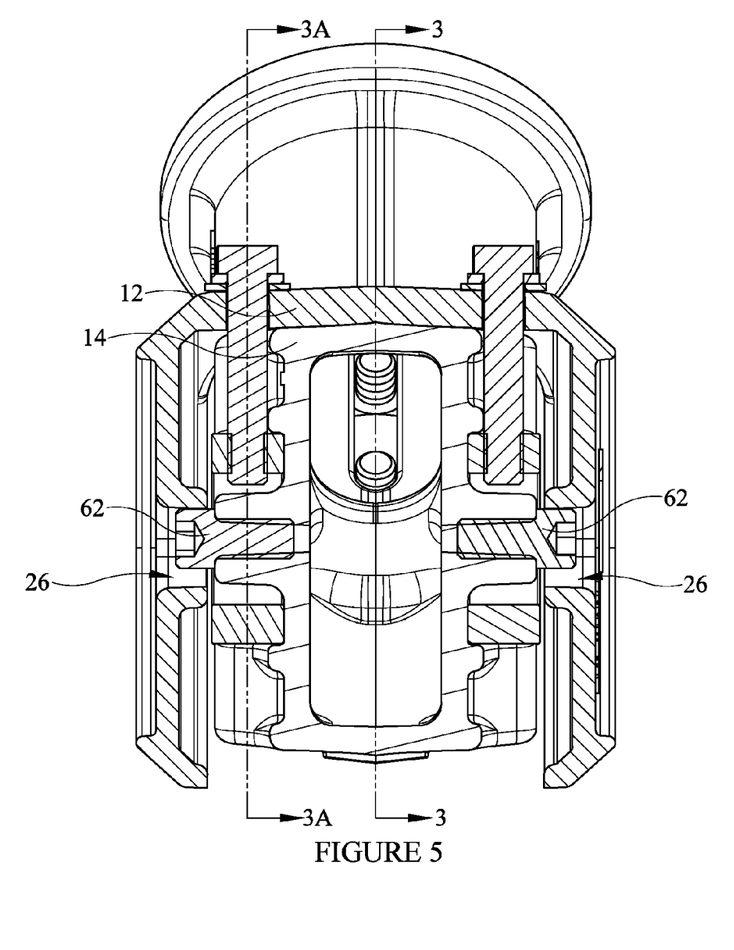
FIG. 5 illustrates a sectional view of the exemplary articulating joint of FIG. 1 cut along the axis of rotation of the joint and in a position wherein ratchet teeth are engaged.

Referring now to FIG. 5, a sectional view of the joint 10 is shown. The section line passes through the axis A revealing the elongate aperture 26 and the bolt head 62 and associated bolt passing therethrough. The aperture 26 as previously described is elongate in shape and therefore allows for a clearance between the walls defining the aperture 26 and the head of the bolt 62. This allows for movement of the joint housing 18 relative to internal joint structure 20. In the position shown, the joint housing 18 is in a downward position such that the teeth 28, 29 are fully engaged and the first joint portion 12 cannot move relative to the second joint portion 14.

Figure 6:
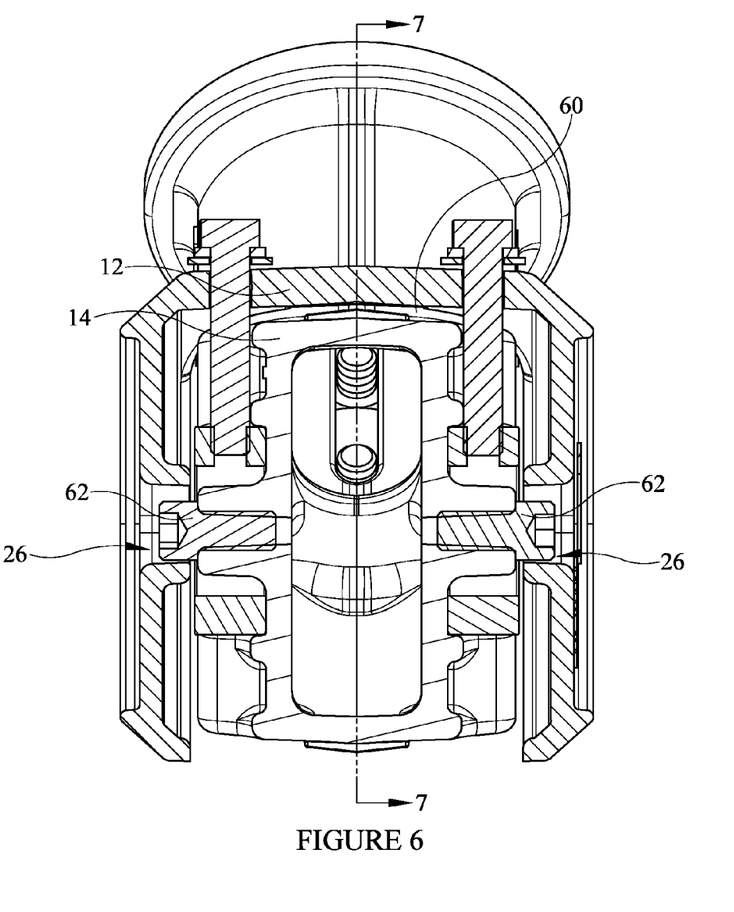
FIG. 6 illustrates a sectional view of the exemplary articulating joint of FIG. 5 cut along the axis of rotation of the joint and in a position wherein ratchet teeth are disengaged.

Referring now to FIG. 6, a sectional view of the joint 10 is shown similar to FIG. 5. However in this position, the joint housing 18 is raised. This is clearly shown by comparison of the bolt head 62 and the elongate aperture 26 with those parts in FIG. 5. As shown, the aperture 26 is moved relative to the bolt head 62 indicating movement of the joint housing 18. In this position, the teeth 28, 29 are disengaged allowing for movement of the joint portion 12 relative to the second joint portion 14. As a result, the gap 60 is increased as compared to when the fastener 34 is solely loosened.

As additionally shown in FIGS. 5 and 6, an internal lumen or pathway allows wires to remain within the joint 10. As a result, the wires are not exposed to environmental conditions. Further, this pathway allows for easy passage of wire as opposed to structures which may block the passageway or make installation difficult in other joint structures.

Figure 7:
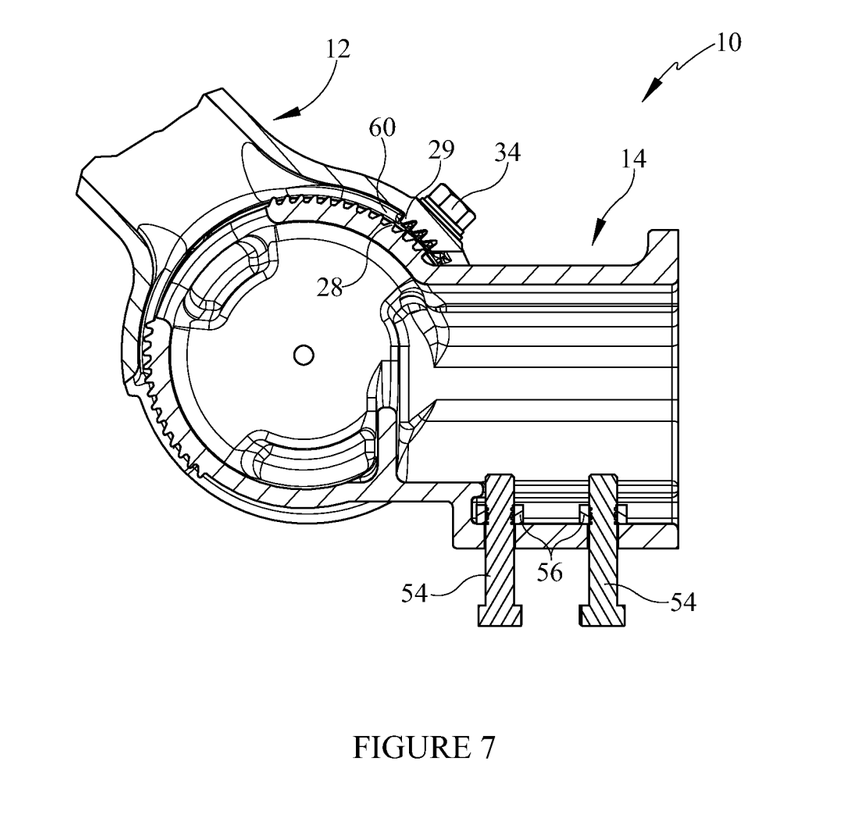
FIG. 7 illustrates a side sectional view of the exemplary articulating joint wherein the joint is loosened for adjustment.

Referring now to FIG. 7, the fastener 34 is loosened so that the gap 60 may be seen relative to the teeth 28, 29. In this position, the joint housing 18 may raised so that the elongate aperture 26 is utilized to further separate the teeth 28, 29. From this position the first joint portion 12 may be rotated or pivoted relative to the second joint portion 14. It should be clear that gravity will normally cause engagement of the teeth 28, 29 when fastener 34 is loosened and support of the joint portion 12 is removed, such as from an installer. At this time, with fastener 34 still loose, the joint housing 18 is moved perpendicular to the direction of axis A.

Referring to FIG. 8, the joint 10 is depicted in the vertical orientation. Specifically, the second joint portion 14 is oriented vertically for receiving of a pole tenon within the second joint portion 14. From this position a luminaire will work in a similar fashion as previously described and this figure is provided merely for exemplary reference. As shown, the first joint portion 12 extends upwardly at about 45 degrees. However, the joint portion 12 may be moved to a substantially horizontal orientation at which point the indicator would indicate zero degrees. In this exemplary configuration, the first joint portion 12 can move between −5 degrees to about +45 degrees, although larger ranges are well within the scope of the present embodiment for example about 100 degrees.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items.

It should also be understood that, unless clearly indicated to the contrary, in any methods claimed herein that include more than one step or act, the order of the steps or acts of the method is not necessarily limited to the order in which the steps or acts of the method are recited.

Reference numerals appearing between the parentheses in the claims, if any, are provided merely for convenience and should not be construed as limiting the claims in any way.

What is claimed is:

1. An adjustable joint for a luminaire, the joint comprising:
    a first joint portion comprising a cylindrical joint housing comprising opposing cylindrical plates and a landing disposed therebetween partially extending along a circumference of said plates, a pair of axially-aligned apertures extending through said plates, a first plurality of interengaging teeth positioned around an inner circumference of said landing, and a mounting structure extending from said joint housing;
    a second joint portion comprising a cylindrical joint member having an aperture axially extending therethrough, a second plurality of interengaging teeth positioned around an outer circumference of said joint member, and a receiver extending from said joint member, said joint member housed within said joint housing such that said apertures are axially aligned; and
    an axial screw extending through the aligned apertures in said first and second joint portions and defining a pivot axis;
    wherein one of said aperture in said second joint portion and said pair of apertures in said first joint portion is elongate in a radial direction, and
    wherein the sizing between the outer circumference of said joint member and the inner circumference of said landing provides a co-axial gap extending between at least a portion of the interengaging teeth on each of said first and second joint portions when the interengaging teeth are released thereby enabling radial movement between said first and second joint portions about said axial screw to release engagement of the of interengaging teeth and enabling engagement of the interengaging teeth by a force of gravity.

2. The adjustable joint of claim 1, further comprising a radial fastener extending through said landing and said joint member.

3. The adjustable joint of claim 2, wherein said radial fastener inhibits motion of one of said first joint portion and said second joint portion in a radial direction.

4. The adjustable joint of claim 1, wherein said landing and said joint member have adjacent faces, said faces each having at least two interengaging teeth.

5. The adjustable joint of claim 1, further comprising an angle indicator on one of said first and second joint portions.

6. The adjustable joint of claim 1, further comprising a structural element disposed within the receiver.

7. The adjustable joint of claim 6, further comprising a luminaire disposed on said mounting structure.

8. An articulating joint for a lighting fixture, comprising:
    a first joint portion comprising a cylindrical joint housing comprising opposing cylindrical plates and a landing disposed therebetween partially extending along a circumference of said plates, a pair of axially-aligned apertures extending through said plates, a first plurality of interengaging teeth positioned around an inner circumference of said landing, and a mounting structure extending from said joint housing;
    a second joint portion comprising a cylindrical joint member having an aperture axially extending therethrough, a second plurality of interengaging teeth positioned around an outer circumference of said joint member, and a receiver extending from said joint member, said joint member housed within said joint housing such that said apertures are axially aligned; and
    an axial screw extending through the aligned apertures in said first and second joint portions and defining a pivot axis;
    wherein one of said aperture in said second joint portion and said pair of apertures in said first joint portion is elongate in a radial direction, and
    wherein the sizing between the outer circumference of said joint member and the inner circumference of said landing provides a co-axial gap extending between at least a portion of the interengaging teeth on each of said first and second joint portions when the interengaging teeth are released thereby enabling radial movement between said first and second joint portions about said axial screw to release engagement of the of interengaging teeth.

9. The articulating joint of claim 8, further comprising a radial fastener inhibiting or allowing said release of said engagement of said interengaging teeth.

10. The articulating joint of claim 8, further defining an opening between said opposing plates of said first joint portion to receive said second joint portion.

11. The articulating joint of claim 8, wherein said interengaging teeth have a profile, a portion of which forms a corresponding circumference extending away from a radius of each corresponding circumference enabling movement in a first rotation direction and inhibiting movement in a second rotation direction.

12. The articulating joint of claim 8, wherein one of said first joint portion and second joint portion is pivotable relative to the other through a range of about 100 degrees.

13. A universal tiltable support for a lighting fixture, comprising:
    a first joint portion comprising a cylindrical joint housing comprising opposing cylindrical plates and a landing disposed therebetween partially extending along a circumference of said plates, a pair of axially-aligned apertures extending through said plates, a first plurality of interengaging teeth positioned around an inner circumference of said landing, and a mounting structure extending from said joint housing;
    a second joint portion comprising a cylindrical joint member having an aperture axially extending therethrough, a second plurality of interengaging teeth positioned around an outer circumference of said joint member, and a receiver extending from said joint member, said joint member housed within said joint housing such that said apertures are axially aligned; and
    an axial screw extending through the aligned apertures in said first and second joint portions and defining a pivot axis;
    wherein one of said aperture in said second joint portion and said pair of apertures in said first joint portion is elongate in a radial direction, and
    wherein the sizing between the outer circumference of said joint member and the inner circumference of said landing provides a co-axial gap extending between at least a portion of the interengaging teeth on each of said first and second joint portions when the interengaging teeth are released thereby enabling radial movement between said first and second joint portions about said axial screw to release engagement of the of interengaging teeth, one of said first and second joint portions being configured to be mounted in both horizontal and vertical positions.

14. The universal tiltable support of claim 13, further comprising said interengaging teeth inhibiting uncontrolled movement of one of said first and second joint portions.

* * * * *